United States Patent [19]
Peasnall

[11] 3,817,340
[45] June 18, 1974

[54] APPARATUS FOR DISPENSING PREDETERMINED QUANTITIES OF MATERIAL INTO CONTAINERS

[75] Inventor: Leonard Charles Peasnall, Warrington, England

[73] Assignee: Agricultural Utilities (Machinery) Limited

[22] Filed: May 29, 1973

[21] Appl. No.: 364,760

[52] U.S. Cl. .............. 177/90, 177/98, 177/93, 177/95, 177/99, 177/60
[51] Int. Cl. ............................................. G01g 13/22
[58] Field of Search ............... 177/60, 89, 90–93, 177/98–100, 119

[56] References Cited
UNITED STATES PATENTS

| | | | |
|---|---|---|---|
| 801,490 | 10/1905 | Webb | 177/98 |
| 830,932 | 9/1906 | Scott | 177/98 |
| 915,941 | 3/1909 | Davis | 177/90 X |
| 1,025,781 | 5/1912 | Broussaro | 177/98 |
| 2,625,361 | 1/1955 | Schrock | 177/98 |
| 3,098,537 | 7/1963 | Petrea | 177/93 X |
| 3,608,657 | 9/1971 | Johnson et al. | 177/93 |

*Primary Examiner*—Stephen J. Tomsky
*Assistant Examiner*—Vit W. Miska

[57] ABSTRACT

A weighing machine comprises two pivoted platforms disposed in a side by side manner with the front ends of the platforms being adapted to receive sacks or containers. The rear ends of the platforms each carry weights of a known mass and are connected by a rocking linkage to a feed chute which is rotated between alternate positions by the rocking linkage so that the feed chute feeds material alternately into the sacks or containers. The change over of the feed chute is effected by one of the platforms being tilted when a sack or container thereon approaches and equals the known mass.

3 Claims, 2 Drawing Figures

PATENTED JUN 18 1974    3,817,340

APPARATUS FOR DISPENSING PREDETERMINED QUANTITIES OF MATERIAL INTO CONTAINERS

This invention relates to apparatus for dispensing predetermined quantities of material into containers.

The invention has been developed to meet the need for a device which can cause quantities of, for example, agricultural crops, especially root crops such as potatoes, to be dispensed automatically into containers such as sacks in quantities which are close to a predetermined weight. Such a device ought to be able to divert the feed of material from a filled container to an empty one when the contents of the filled container attains the predetermined weight in order to give an opportunity for automatic or manual removal of the filled container, and substitution of an empty container.

An object of the invention therefore, is to provide apparatus for dispensing predetermined quantities of material into containers which is capable of meeting this need.

The invention provides apparatus for dispensing predetermined quantities of material into containers, comprising a material feeding chute disposed to dispense material alternately into two adjacent containers, and means causing said chute to be directed from one of said containers to the other of said containers when the contents of said one container approaches said predetermined quantity.

Preferably the apparatus comprises two platforms disposed side by side and pivoted so that one end of each platform is at one side of the pivot axis, and the other end of each platform is at the other side of the pivot axis. One end of each platform thus defined by the pivot axis provides a support for a container to be filled, such as a sack, while the other provides a support for a balance weight of known weight to determine the weight of material to be dispensed into the containers. In this version also, each platform has a connecting rod attached thereto at the end of the platform which carries the weights. These connecting rods are each connected to one end of a pivoted rocker bar, which is adapted to rotate, by its rocking, a shaft, and the shaft is mechanically connected to the chute so that rotation of the shaft causes rotation of the chute so that its outlet is diverted from one container position to the adjacent container position.

A preferred embodiment of apparatus according to the invention will now be described by way of example with reference to the accompanying drawings, wherein.

The apparatus 10 according to the invention, which is to be described, is designed to function mainly in the bagging of root crops, particularly potatoes but can be used for granular, particulate or powdered materials also, as for example fertilizers and feed pellets, or dry chemical substances.

The apparatus 10 comprises a chute 11, which is inclined and wider at the top (inlet) end 12 and narrower at the bottom (outlet) end 13. This chute 11 is arranged to swing between two alternative positions at each of which material falling down the chute 11 is directed into a container. The top end 12 of the chute 11 is disposed in relation to flexible or swingable baffles not shown so that in both positions material from a conveyor or other continuous source not shown is able to enter the chute 11.

Figure 1:
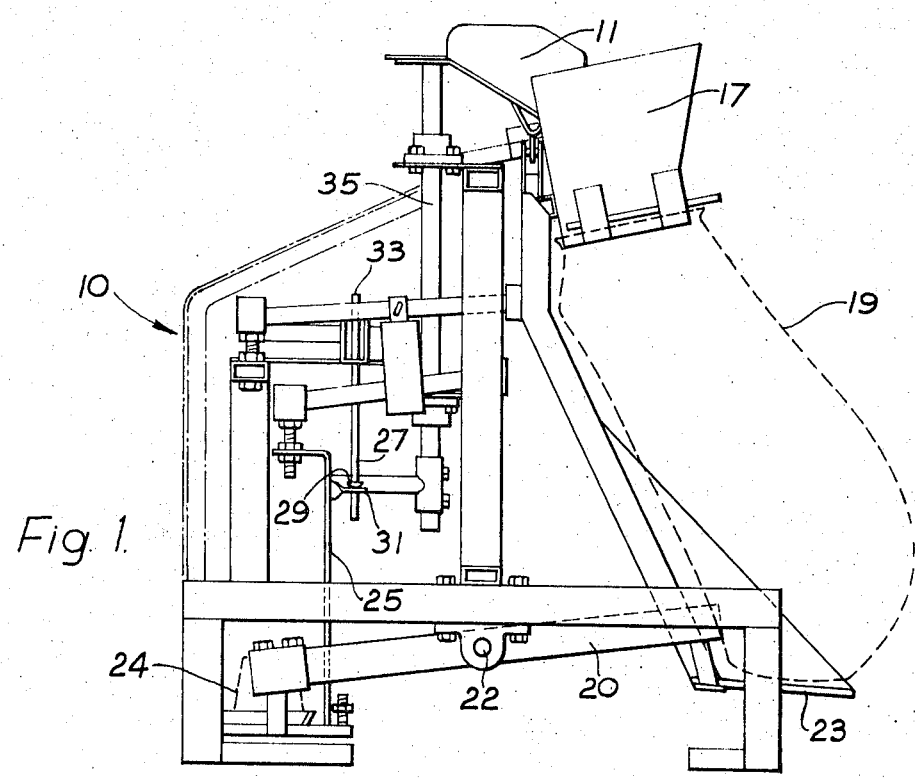
FIG. 1 is a view of an apparatus according to the invention from one side.
Figure 2:
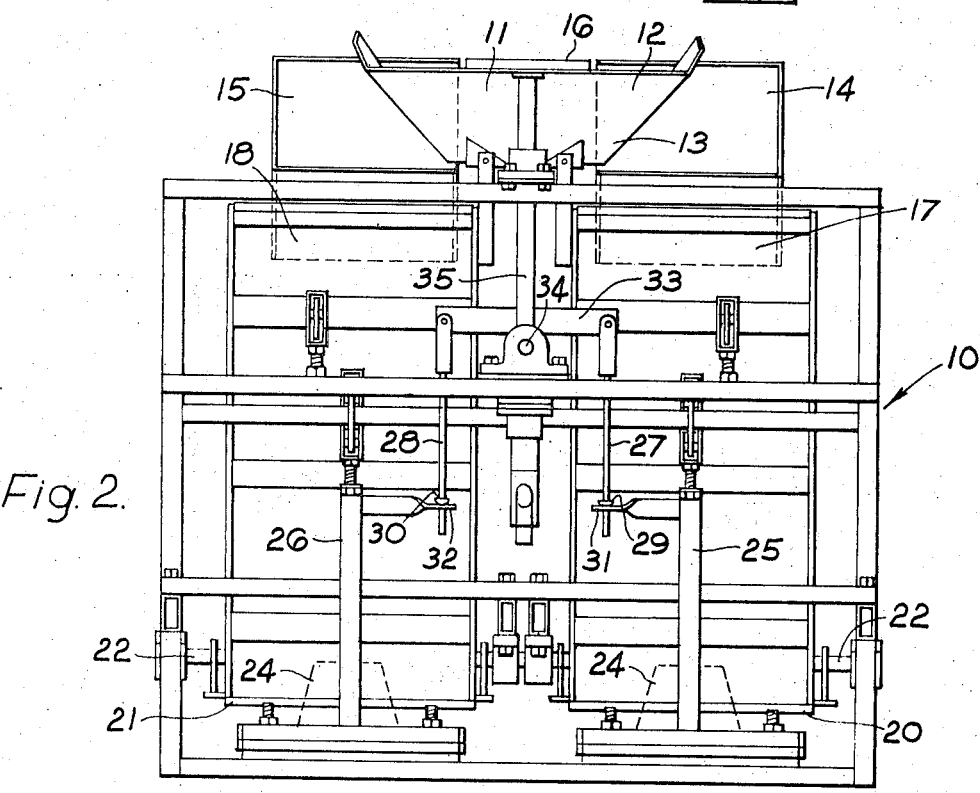
FIG. 2 is a rear view of the apparatus of FIG. 1.

The bottom end 13 of the swingable chute co-operates with baffles which define two outlets 14 and 15 and a central closed portion 16. A short fixed chute 17 or 18 leads from each outlet 14 or 15 to the position which the inlet of a container 19 (shown in broken lines in FIG. 1) would occupy.

Below the chute arrangement are two platforms 20, 21 each pivoted, see-saw fashion, about half-way along their length at 22. Each platform 20 or 21 carries, to one side of the respective pivot axis, and disposed below one of the two fixed outlet chutes 17 or 18, a holder or cradle 23 for holding a container 19 during filling in a suitable inclined position with its inlet adjacent the outlet of the respective fixed outlet chute 17 or 18. The other side of each platform 20 or 21 is adapted to carry one or more weights 24 of known mass, and to the platform at the weight support zone is connected pivotably the end of a link rod 25, 26.

The link rods 25, 26 extend upwardly from their respective platforms 20, 21 and are each connected slidably at their other ends to a respective push rod 27, 28. Each push rod 27, 28 carries an adjustable stop member 29, 30 which causes raising motion of one of the rods 25, 26 to push a respective eye member 31, 32 against the stop 29, 30. Sinking of the rod 25 or 26 does not entrain the rod 27 or 28 as the eye 31, 32 slides on the shaft of the rod 27, 28. Each rod 27, 28 is pivotally attached at its upper end to a centrally pivoted rocker lever 33. The rocker lever 33 is connected to a horizontal shaft 34 journalled in the frame of the apparatus, and pivots or rocks about the axis of the shaft 34 so that the rocking of the rocker bar 33 will rotate the shaft 34.

Shaft 34 is rotationally coupled with a vertical shaft 35 by means of meshing bevel gears (not shown). The vertical shaft 35 is in turn integrally rotatable with the swingable chute 11.

In operation, the swingable chute 11 is directed so that (for example) potatoes are fed from a conveyor, down the swingable chute 11 through one of the outlets 14, down the respective outlet chute 17 and into, for example, a sack 19 supported on one of the platforms 20. When the contents of the sack 19 approaches the weight of the weight 24 on the other part of the platform 20, the platform 20 begins to tilt slowly, the bag 19 tending to sink as the platform approaches and then passes equilibrium.

The tilting of the platform 20 forces the connecting lever 25 up to push on the stop 29, causing rod 27 to rise which in turn causes the rocker bar 33 to rock. Meanwhile the other platform is in a position wherein the weight side is lower. The rocking of the rocker bar 33 rotates the horizontal shaft 34 which rotates the vertical shaft via the gears. This causes the swingable chute 11 to gradually move from the position wherein it supplies material to the first container 19 through the chute 17 to the position where it supplies material to another container through the chute 13.

The motion of the chute 11 has the effect that, when equilibrium, and hence the desired contents weight is approached, the supply of material to container 19 is gradually reduced, so that at the moment of equilibrium, the supply is cut off by the chute outlet 13 moving to register with the closed part 16 of the baffle and then to the other outlet.

It has been found to be possible to weight agricultural produce in hundred-weight, half hundred-weight and quarter batches well within the permitted tolerances, and almost literally to the "nearest potato." Metric conversion, with this apparatus presents no problem since it is merely necessary to substitute the appropriate weights, which may be e.g. 10, 25 and 50 kg.

The apparatus of the invention is not restricted in its application to dispensing agricultural root crops into sacks and is capable of application wherever continuous filling of containers to approximate weights, especially in the quarter to 100 weight range, for example with grain, fertillizers, sugar, fruit and many other applications is required. Tolerances within a few ounces can be achieved though obviously if the last potato to enter the container is a large one, the weight would in fact be exceeded. The containers need not be sacks and could for example be drums or canisters. The invention could also be applied to dispensing bulk liquids such as oil or molasses into containers for wholesale and retail purposes, the interfaces of chutes and baffles being appropriately sealed and the sizes of orifices and outlets being adapted to the viscosity of the material to produce a manageable flow rate.

In the agricultural field, the apparatus of the invention, in combination with known harvesting machines makes possible the preparation of accurately weighed quantities of produce straight from the field with a reduction of labour, since only one man is needed to remove filled sacks and replace them with empties, and no-one is needed to operate the machine. The apparatus requires no power source, so that it can be operated in any situation where power is not available and when fitted to a harvester does not impose any additional demands on the tractor other than those due simply to its weight, either directly through a power take off or indirectly through a land wheel.

What I claim is:

1. Apparatus for dispensing predetermined quantities of material into containers comprising:
    a feeding chute having an outlet disposed to dispense material alternately into a pair of adjacent containers,
    means for causing the chute to be directed from one to the other of the containers when the contents of the one of the containers approach a predetermined quantity level,
    a pair of platforms disposed in side-by-side relationship with each being pivoted so that one end of each platform is at one side of the pivot axis and the other end is at the opposite side of the respective pivot axis,
    one end of each platform providing a support for a balance weight of known weight to determine the weight of material to be dispensed into the containers,
    each platform having a connecting rod attached thereto at the end of the weight carrying platform,
    a shaft,
    a pivoted rocker bar connected at one of its ends to each of the connecting rods and being adapted to rotate the shaft,
    the shaft being mechanically connected to the feeding chute for inducing shaft rotation and resultant diversion of the feeding chute outlet from one container-charging position to the other container-charging position.

2. Apparatus according to claim 1 and including, a fixed chute associated with each container, and a swingable chute movable between positions where it feeds either fixed chute, the fixed chutes being associated with baffles which define a closed zone between the fixed chutes so that no material is lost during transfer of the swingable chute between the fixed chutes.

3. Apparatus for dispensing predetermined quantities of material into containers comprising in combination:
    a feeding chute having an outlet disposed for dispensing material alternately into a pair of adjacent containers,
    means for causing the chute to be directed alternately from one to the other of the containers when the contents of the one of the containers approach a predetermined quantity level,
    a pair of platforms in side-by-side disposition with each being pivoted so that one end of each platform is at one side of the pivot axis and the other end is at the opposite side of the respective pivot axis,
    one end of each platform providing a support for a balance weight of known weight to determine the weight of material to be dispensed into the containers,
    each platform having a connecting rod attached thereto at the end of the weight carrying platform,
    a shaft,
    a pivot rocker bar connected at one of its ends to each of the connecting rods for rotating the shaft,
    the shaft being mechanically connected to the chute for inducing shaft rotation and resultant diversion of the feeding chute outlet from one to the other of the container-charging positions,
    the mechanical connection of shaft and chute being affected by the shaft being connected in a rotationally integral manner to the chute and to the pivoted rocker bar.

* * * * *